Feb. 18, 1930.  E. G. REESE  1,747,321

DISHWASHING MACHINE

Filed Feb. 14, 1928

INVENTOR.

Erna G. Reese

BY Robt. W. Pearson

ATTORNEY.

Patented Feb. 18, 1930

1,747,321

UNITED STATES PATENT OFFICE

ERNA G. REESE, OF MONTROSE, CALIFORNIA

DISHWASHING MACHINE

Application filed February 14, 1928. Serial No. 254,297.

This invention relates to a dish washing machine of that type wherein a liquid container is combined with a receptacle for containing dishes to be washed, such receptacle being supported within said container in spaced relation to the bottom or sides thereof and the space between said container and receptacle containing liquid, means being provided for creating a current or currents in said liquid, and for directing these currents of liquid through apertures in the wall of the receptacle which contains the dishes to be washed.

An important object of this invention is to provide improved means for efficiently circulating the cleansing liquid through the dishes to be washed.

Another object of the invention is to provide a dish washing machine which will have improved features in respect to simplicity and compactness of construction, and to provide parts which are so assembled as to be readily removed for cleaning.

Other objects and advantages may hereinafter appear.

Referring to the accompanying drawings, which illustrate a preferred embodiment, Figure 1 is a vertical mid-section of the complete machine, on line 1—1 of Figure 2.

Figure 2:
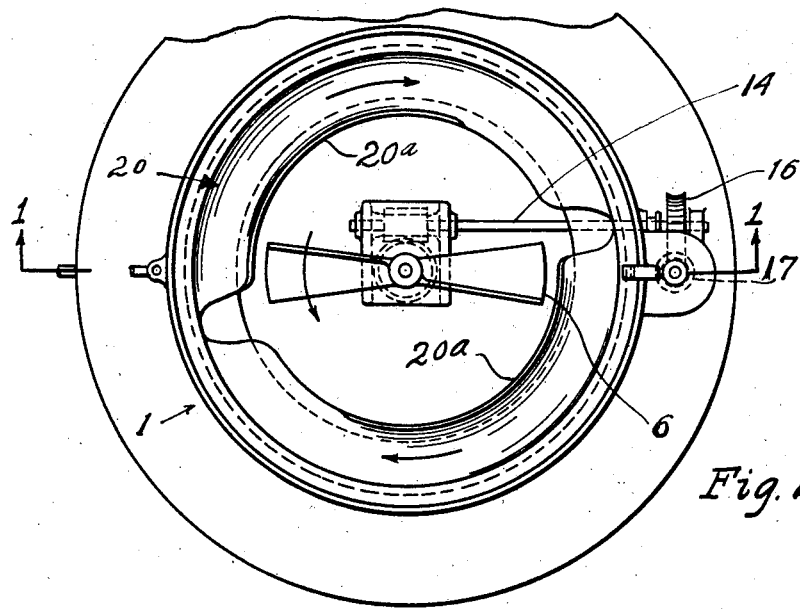
Figure 2 is a plan view the cover being removed.

Referring in detail to the drawings, within a cylindrical container 1 is mounted a foraminated receptacle 2 which has at its top a radial flange 3 whereby it is suspended within the container 1 with its bottom and sides in spaced relation to said container. By preference and as shown said receptacle is shaped as an inverted truncated cone. This receptacle is suspended within the container 1 at a sufficient distance above the bottom thereof to provide room for a rotary liquid propeller 5, having horizontally extending blades 6 which are adapted to rotate in a horizontal plane to create an eddy in the liquid with which the container is filled up to near its top. Said propeller 5 is provided with an upright driven shaft 7 which has a bearing 8 supported by a spider-like standard 9. The lower end of shaft 7 is seated in a socket 10 and has a bearing 8, and the shaft 7 has fixed thereto a gear 12 which is in mesh with a worm gear 13, the latter gear being driven by horizontal shaft 14 which extends through a stuffing box 15 just above the bottom of the container. Said shaft 14 may be driven in any suitable manner as by the gear 16 which is in turn driven by a worm gear 17 fixed to the shaft 18 of the motor 19. By preference said motor is secured to the upper portion of the side of the container 1 as shown. This convenient arrangement of the motor is possible by reason of the fact that said horizontal shaft 14 extends through the side wall of the container near the bottom thereof.

Figures 1, 3:
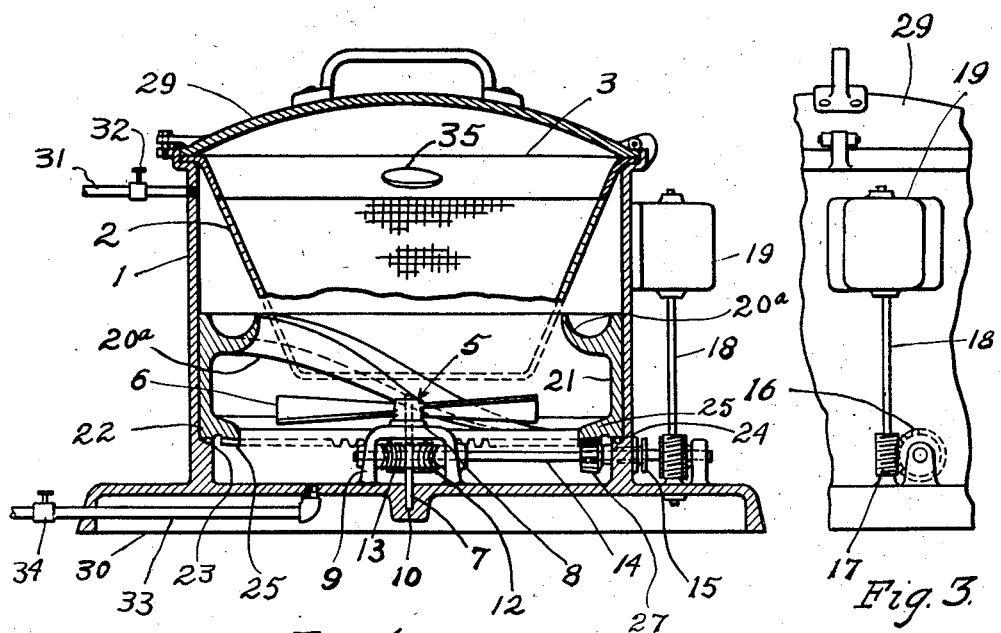
Figure 3 is a fragmental side elevation.

In order to aid in directing upwardly and through the dishes the outer portion of the liquid eddy formed by the rotation of propeller 5, a reversely rotating propeller construction 20 is provided to cooperate with the first recited propeller. This cooperating propeller is provided with a series of upwardly inclined propeller blades 20ª which are carried by an annulus or generally ring shaped member 21 which is rotatably fitted within the lower portion of container 1. Said ring shaped member is shown as having an inwardly directed base flange 22 which seats upon or is in close proximity to an annular shoulder 23 around the bottom of the container 1. A series of anti-friction rollers 24 are preferably provided beneath said flanges 23. The lower face of flange 22 is provided with a toothed portion or rack 25, and to the shaft 14 is fixed a gear 27 which is in mesh with said rack. The blades 20ª of the annular propeller extend upwardly at an inclination as best shown in Figure 1 and are curved so as to be confined within the space between the outer sides of the receptacle 2 and the inner sides of the container 1.

These blades 20ª are shown as ribs or shelves which are preferably cast integral with the annulus 21. These ribs are placed above each other, each rib desirably extending about one third around the annulus.

The device is preferably provided with a rather thick bottom portion 30 which may be placed upon a cook stove or over a gas burner for heating the liquid therein, and is also provided with a lid 29. This construction adapts the appliance to keep the liquid hot for a considerable period of time even after it is removed from the source of heat.

31 designates a supply pipe near the top of the container which is controlled by a valve 32, and 33 designates a drainage pipe controlled by the valve 34. Handles 35 are desirably provided to aid in handling the dish receptacle.

The gears of the propellers are so arranged that one of the propellers is driven in a clockwise direction and the other propeller is simultaneously driven in the reverse direction, the rotation of the outer propeller being in such a direction as to cause its inclined blades or shelves 20 to raise the liquid as well as to give it a rotary movement.

By means of shaft 18 and gears 17 and 16 the motor 19 rotates shaft 14 with its gear 27, the latter gear meshing with rack 25 which forms a part of the annulus 21 of the outer propeller, the propeller fan 6 being at the same time driven in the opposite direction by means of gears 12 and 13. Said fan 6 therefore offsets the tendency of the outer propeller to form a liquid eddy within the container and hence causes the spiral blades 20ª to act upon the liquid more effectively and make it cleanse the dishes better.

The dish reseptacle 2 having been filled with the dishes to be washed and mounted within the container as shown in Figure 1, the motor 19 is placed in operation and the water thus driven through the foramina of said receptacle 2. This operation is continued until the dishes are properly cleansed. If it is desired to keep the appliance in continuous operation, the dish receptacle 2 is then removed, and hot rinsing water may then be poured over the dishes, after which they are removed for drainage and the receptacle 2 put back in place ready to receive a new lot of unwashed dishes. If, however, but a single lot of wishes are to be washed, after the liquid has been circulated sufficiently through the operation of the motor, the motor is stopped, the drainage valve 34 is opened and after the wash water has been allowed to escape hot rinse water is poured over the dishes and also allowed to escape through the open drainage valve. Or, if plenty of hot rinse water is available, the appliance will be filled with hot water again and the motor again started and kept in operation until the hot rinse water has been circulated through the dishes and their thorough cleansing is thus made doubly certain. Thereupon the drain valve is again opened, the cover 29 removed and the hot dishes allowed to stand until dry.

I claim:

1. In a dish washing machine, a cylindrical container, a foraminated receptacle to suspend dishes within said container, the bottom and sides of said receptacle being in spaced relation to the bottom and sides of said container, a liquid propeller within said container beneath said receptacle, said propeller having an upright driving shaft located centrally of said container, means to rotate said shaft, and an annular reversely rotating propeller surrounding the first recited propeller to aid in directing upwardly the outer portion of the liquid eddy formed by the rotation of the propeller first recited.

2. In a dish washing machine, a cylindrical container, a foraminated receptacle to suspend dishes within said container, the bottom and sides of said receptacle being in spaced relation to the bottom and sides of said container, a liquid propeller within said container beneath said receptacle, said propeller having an upright driving shaft located centrally of said container, means to rotate said shaft, and a reversely rotating propeller to aid in directing upwardly the outer portion of the liquid eddy formed by the rotation of the propeller first recited, said reversely rotating propeller having a series of inclined blades which extend up into the space between the lower side portions of the recited receptacle and the sides of said container.

3. In a dish washing machine, a cylindrical container, a foraminated receptacle to suspend dishes within said container, the bottom and sides of said receptacle being in spaced relation to the bottom and sides of said container, a liquid propeller within said container having propelling blades within the space between the sides of said receptacle and container to direct the liquid upwardly, means to rotate said propeller, a propeller located beneath said receptacle, and means to simultaneously rotate said propellers in reverse directions.

4. In a dish washing machine, a cylindrical container, a foraminated receptacle to suspend dishes within said container, the bottom and sides of said receptacle being in spaced relation to the bottom and sides of said container, a liquid propeller within said container beneath said receptacle, said propeller having an upright driving shaft located centrally of said container, a horizontal shaft geared to said upright shaft to rotate it, said horizontal shaft extending through the side wall of the lower part of said container, and a reversely rotating propeller extending around the first named propeller and geared to said horizontal shaft to aid in directing upwardly the outer portion of the liquid eddy formed by the rotation of the propeller first recited.

In testimony whereof I affix my signature.

ERNA G. REESE.